C. E. KING.
METHOD OF MANUFACTURING ENDLESS V-SHAPED OR ANGULAR BELTS.
APPLICATION FILED MAR. 10, 1920.
1,401,480.
Patented Dec. 27, 1921.
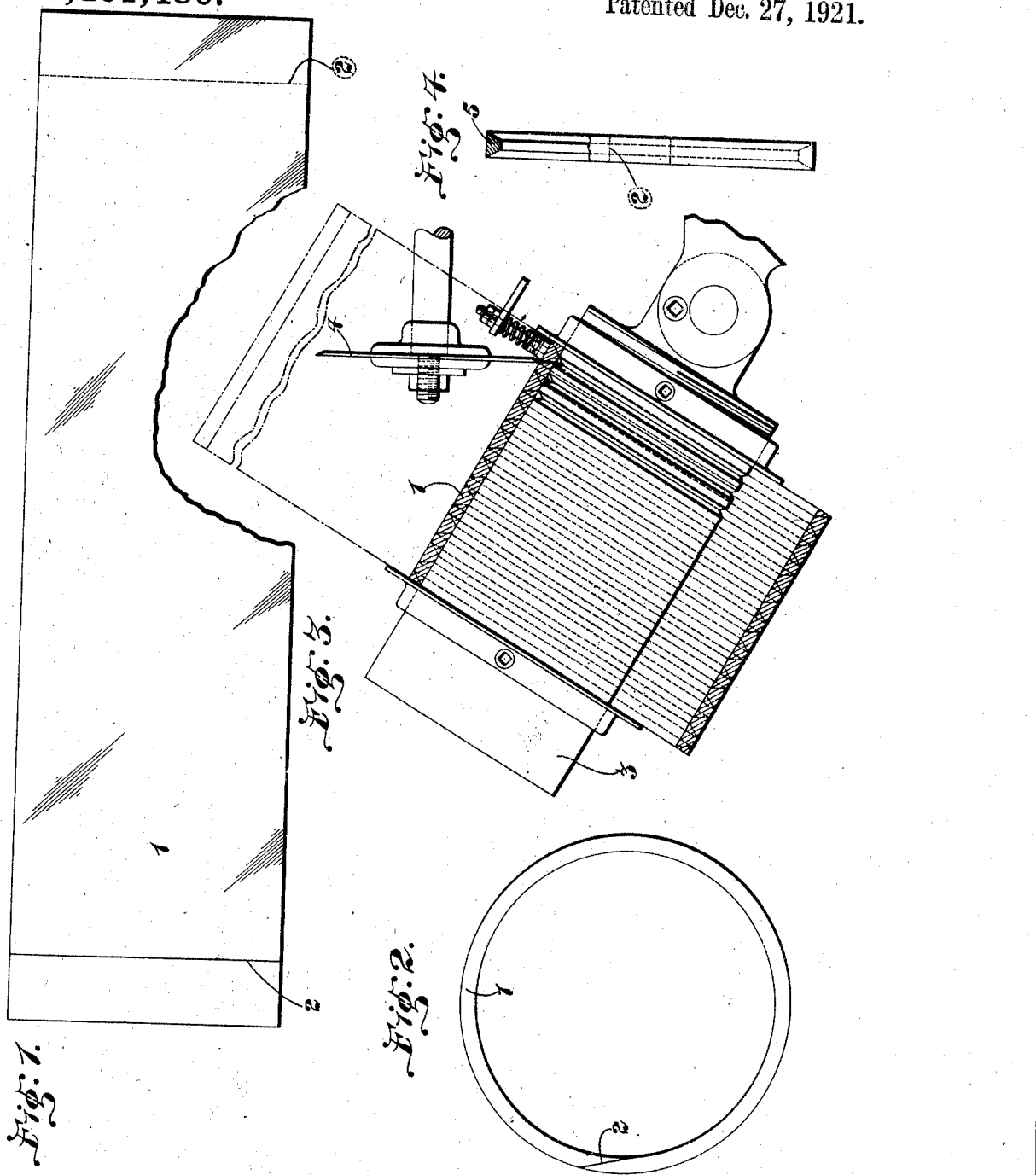

UNITED STATES PATENT OFFICE.

CHARLES E. KING, OF ST. LOUIS, MISSOURI, ASSIGNOR TO CAPEN BELTING AND RUBBER COMPANY, OF ST. LOUIS, MISSOURI, A CORPORATION OF MISSOURI.

METHOD OF MANUFACTURING ENDLESS V-SHAPED OR ANGULAR BELTS.

1,401,480.     Specification of Letters Patent.     Patented Dec. 27, 1921.

Application filed March 10, 1920. Serial No. 364,767.

*To all whom it may concern:*

Be it known that I, CHARLES E. KING, a citizen of the United States, residing at the city of St. Louis and State of Missouri, have invented a new and useful Improvement in Methods of Manufacturing Endless V-Shaped or Angular Belts, of which the following is a specification.

This invention relates to an improved method of manufacturing endless V-shaped or angular belts.

Heretofore in practice in the manufacture of V-shaped or angular belts a strip of a sufficient length to form the belt is cut from a slab of leather or other material and the edges are beveled off by cutting at an angle to the side edges of the belt. This practice has resulted in substantial waste of material and also has been expensive from a labor standpoint.

Under the present method a cylindrical blank is first formed from a rectangular slab of leather or other material, the blank being of a sufficient dimension to cut therefrom a plurality of belts. After the formation of the cylindrical blank, an edge thereof is trimmed at an angle and then the blank is alternately cut from the outer and inner periphery in such a manner that the cut will properly bevel the edge of the belt severed from the blank, and leave an angular cut at the edge of the blank for the next belt.

From the foregoing general description of the method of manufacture, it will be observed that an object of the invention is to provide an improved method of cutting V-shaped or angular belts from a cylindrical blank, whereby a saving of material as well as a saving of labor in manufacture is accomplished.

The details of the improved method as well as the advantages thereof will be apparent from the following description taken in connection with the accompanying drawing, in which—

Figure 1 illustrates a rectangular slab from which the cylindrical blank is formed.

Fig. 2 is an end view of the cylindrical blank showing the edges of the slab joined together to form an endless blank.

Fig. 3 illustrates the method employed for cutting the blank into the belts.

Fig. 4 is a view of the belt formed by the improved method of manufacture.

In the first instance a slab 1 of leather, composition or other material of a suitable dimension for producing belts of desired length, is joined at its ends forming a connection 2. The slab from which the blank is formed may be made of any number of plies of the material desired to form belts of different or varying thicknesses. Any suitable form of connection of the ends may be employed.

After the blank has been formed, it is placed on a revolving support 3 that is arranged at an angle in respect of the cutter 4. The angle of the support and the cutter is adjustable so that the angle of the edge of the belt 5 may be varied according to manufacturing requirements. The blank is alternately placed on the support so that the cutter will cut the same from the outer surface and then from the inner surface. After the blank is placed on the support, the support is raised so that the blank will contact with the cutter to perform a surface or scoring cut that constitutes a means of forming a slight indentation or groove in the surface of the blank.

After the groove is formed the support is further raised so that the cutter will cut through the blank. By alternately cutting the blank from the outer and inner surface, the blank is cut throughout its length forming belts having uniform angular edges and all the material, with the exception of the initial and final trimming cuts at the ends of the blank, is utilized, thereby eliminating a substantial waste of material that occurs where the strips are first trimmed and then joined together at their ends to form the belts.

The present method also greatly reduces the labor that results from the double trimming of the straight strips and of separately joining the ends of the strips.

What I claim and desire to secure by Letters Patent, is:—

1. The method of manufacturing V-shaped or angular belts, which consists of forming an endless cylindrical blank from a rectangular slab of material, and alternately cutting the edge of the blank at spaced intervals from the outer and inner surface thereof.

2. The method of manufacturing V-shaped or angular belts, which consists in forming an endless cylindrical blank from a slab of material of sufficient width to cut a plurality of belts therefrom, and cutting the cylindrical blank at spaced intervals alternately from the outer and inner surface at a uniform angle.

3. The method of manufacturing V-shaped or angular belts, which consists in forming a cylindrical blank, and cutting the blank at an angle from the outer surface and then from the inner surface thereof at spaced intervals.

4. The method of manufacturing endless belts which consists in forming a cylindrical blank of sufficient dimensions to provide a plurality of belts, forming grooves along each line of severance, and cutting the blank along said grooves from the inner and outer surfaces of the blank.

5. The method of manufacturing V-shaped or angular belts, which consists in forming a cylindrical blank, forming a groove along each line of severance near the side edges of the blank, and cutting the edges of the blank along said grooves at opposite angles of inclination from the inner and outer surfaces of the blank.

CHARLES E. KING.